(12) United States Patent
Zhang et al.

(10) Patent No.: US 11,431,827 B2
(45) Date of Patent: Aug. 30, 2022

(54) DATA CENTER MANAGEMENT SYSTEM

(71) Applicant: Shanghai Data Center Science Co., Ltd, Shanghai (CN)

(72) Inventors: Jun Zhang, Shanghai (CN); He Liu, Shanghai (CN); Jie Zhang, Shanghai (CN)

(73) Assignee: Shanghai Data Center Science Co., Ltd, Shanghai (CN)

( * ) Notice: Subject to any disclaimer, the term of this patent is extended or adjusted under 35 U.S.C. 154(b) by 0 days.

(21) Appl. No.: 17/283,537

(22) PCT Filed: Mar. 24, 2020

(86) PCT No.: PCT/CN2020/080854
§ 371 (c)(1),
(2) Date: Apr. 7, 2021

(87) PCT Pub. No.: WO2020/192649
PCT Pub. Date: Oct. 1, 2020

(65) Prior Publication Data
US 2021/0392198 A1     Dec. 16, 2021

(30) Foreign Application Priority Data
Mar. 27, 2019    (CN) .......................... 201910240601.2

(51) Int. Cl.
*H04L 67/60* (2022.01)
*H04L 47/70* (2022.01)
(Continued)

(52) U.S. Cl.
CPC ............ *H04L 67/60* (2022.05); *H04L 47/827* (2013.01); *H04L 61/5007* (2022.05); *H04L 67/1097* (2013.01); *G06F 16/27* (2019.01)

(58) Field of Classification Search
CPC ... H04L 67/60; H04L 67/1097; H04L 47/827; H04L 61/5007; G06F 16/27; G06F 16/182; G06F 9/5061
See application file for complete search history.

(56) References Cited

U.S. PATENT DOCUMENTS

2013/0159529 A1    6/2013   Mitchell et al.
2015/0067679 A1    3/2015   Naseh et al.
(Continued)

FOREIGN PATENT DOCUMENTS

CN    102104631 A    6/2011
CN    102891896 A    1/2013
(Continued)

OTHER PUBLICATIONS

Rolia, Jerry, et al. "A capacity management service for resource pools." Proceedings of the 5th international workshop on software and performance. (Year: 2005).*
(Continued)

*Primary Examiner* — John M Macilwinen
(74) *Attorney, Agent, or Firm* — McCarter & English, LLP

(57) ABSTRACT

Provided is a data center management system including a data center, a cloud platform and an application platform. The application platform is configured to perform external network access through an application interface layer and send a calculation request to the data center. The data center includes a storage resource pool configured to perform distributed storage of files, and a network resource pool configured to send a scheduling request to the cloud platform according to the calculation request, to schedule the cloud platform. The cloud platform includes a calculation resource pool configured to perform a distributed calculation between adjacent processing nodes according to a received scheduling request, and call files in the storage resource (Continued)

pool, or a calculation resource in a shared database and external shared data in the shared database, and the shared database configured to collect and store the calculation resource and the external shared data.

10 Claims, 1 Drawing Sheet

(51) Int. Cl.
  *H04L 67/1097* (2022.01)
  *H04L 61/5007* (2022.01)
  *G06F 16/27* (2019.01)

(56) References Cited

U.S. PATENT DOCUMENTS

| | | | |
|---|---|---|---|
| 2016/0328683 | A1 | 11/2016 | Palavalli et al. |
| 2016/0357443 | A1 | 12/2016 | Li et al. |
| 2019/0205173 | A1* | 7/2019 | Gupta .................. G06F 16/182 |

FOREIGN PATENT DOCUMENTS

| | | |
|---|---|---|
| CN | 103491158 A | 1/2014 |
| CN | 105809606 A | 7/2016 |
| CN | 107959588 A | 4/2018 |
| CN | 108037993 A | 5/2018 |
| CN | 108287749 A | 7/2018 |
| CN | 108491271 A | 9/2018 |
| CN | 110071965 A | 7/2019 |

OTHER PUBLICATIONS

Gmach, Daniel, Jerry Rolia, and Lucy Cherkasova. "Satisfying service level objevtices in a self-managing resource pool." 2009 Third IEEE International Conference on Self-Adaptive and Self-Organizing Systems. IEEE. (Year: 2009).*

Huang, Lu, Hai-shan Chen, and Ting-ting Hu. "Survey on Resource Allocation Policy and Job Scheduling Algorithms of Cloud Computing 1." J. Softw. 8.2: 480-487. (Year: 2013).*

Yang, Dongju and Chuan Ren. "VCSS: An Integration Framework for Open Cloud Storage Services." 2014 IEEE World Congress on Services: 155-160. (Year: 2014).*

Zhao, Jie. "A Benefit-driven Task Scheduling Algorithm based on Genetic Algorithm in Cloud Computing.". (Year: 2015).*

International Search Report dated Jul. 3, 2020, issued by the International Searching Authority (ISA/CN) in connection with International Application No. PCT/CN2020/080854, and English translation thereof (4 pages).

* cited by examiner

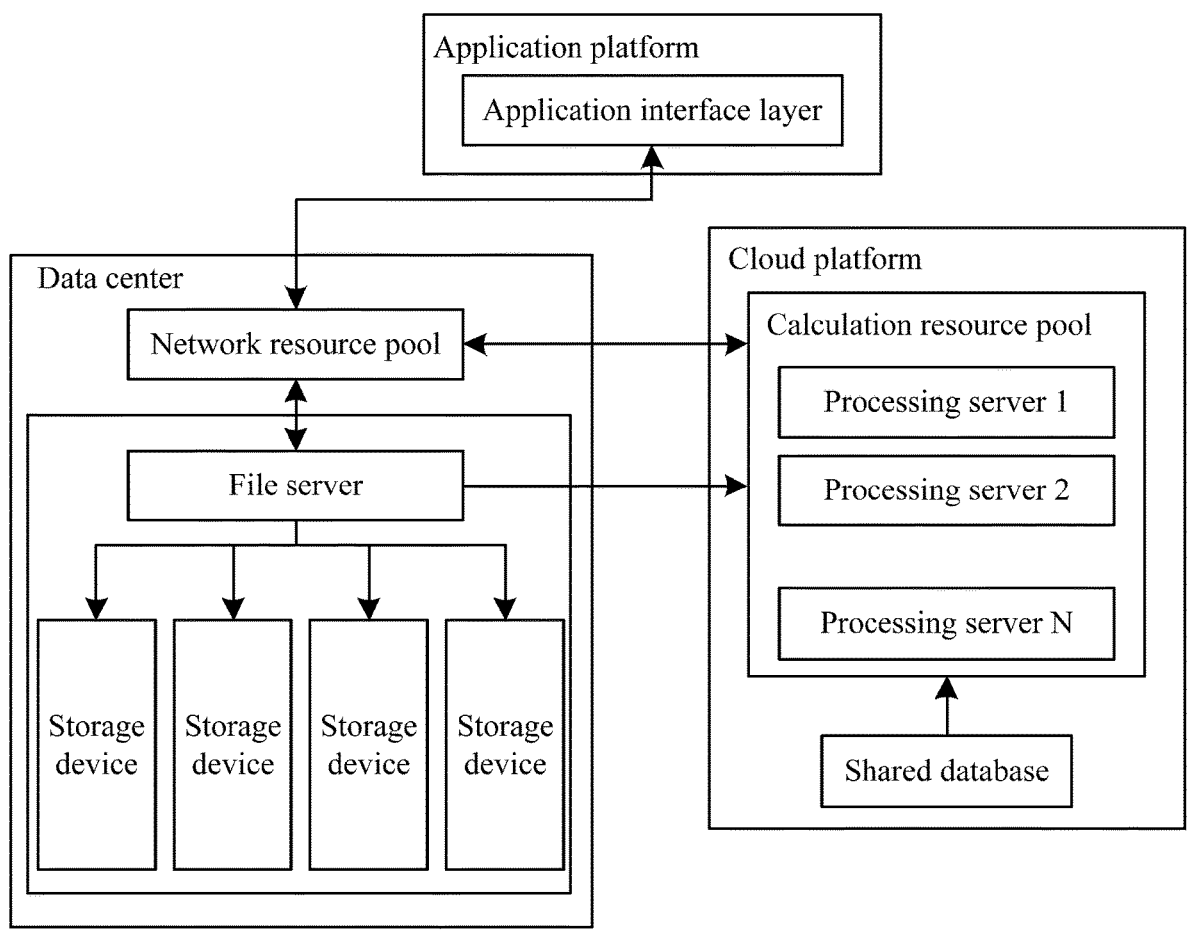

DATA CENTER MANAGEMENT SYSTEM

CROSS-REFERENCE TO RELATED APPLICATIONS

This is a National Stage Application filed under 35 U.S.C. § 371 based on International Patent Application No. PCT/CN2020/080854, filed on Mar. 24, 2020, which claims priority to Chinese Patent Application No. 201910240601.2 filed on Mar. 27, 2019, the disclosures of both of which are incorporated herein by reference in their entireties.

TECHNICAL FIELD

The present disclosure relates to the field of computer technologies, and for example, to a data center management system.

BACKGROUND

With the rapid development and gradual enlargement of the scale of Internet traffic, data traffic contents are increasingly rich, the number of users has gradually increased, and a data center (DC) technology is generated to meet the requirements for Internet traffic and enterprise and public institution information services, namely, an application infrastructure constructed to meet the requirements for the Internet traffic and the enterprise and public institution information services provides, through a high-speed connection with the Internet, large-scale, high-quality, safe and reliable host hosting, host renting, network bandwidth renting and related value-added services for customers. However, a traditional data center only performs a limited integration on the basis of a hardware server, for example, multiple virtual machines share the performance of one entity server. However, this simple intensification is limited by the resource scale of a single entity server, real-time and rapid resource re-allocation is difficult to achieve, and resource idleness and waste are easily caused.

SUMMARY

The present application provides a data center management system, multiple calculation nodes are connected to form a large virtual resource pool to improve the calculation efficiency, so that the efficiency and scale of the resource re-allocation are not limited by a single entity server.

The present application discloses a data center management system. The data center management system includes a data center, a cloud platform and an application platform. The application platform is configured to perform external network access through an application interface layer and send a calculation request to the data center. The data center includes a storage resource pool and a network resource pool. The storage resource pool is configured to perform distributed storage of files, and the network resource pool is configured to send a scheduling request to the cloud platform according to the calculation request, to schedule the cloud platform. The cloud platform includes a calculation resource pool and a shared database. The calculation resource pool is configured to perform a distributed calculation between adjacent processing nodes according to a received scheduling request, and call files in the storage resource pool, or a calculation resource in the shared database and external shared data in the shared database; and the shared database is configured to collect and store the calculation resource and the external shared data.

In an embodiment, the application interface layer is configured to receive an application service message, determine a target application service category according to the application service message, and parse out resource consumption information according to the target application service category; and the calculation request includes the target application service category and the resource consumption information.

In an embodiment, the calculation request further includes calculation demand information, and the scheduling request includes the calculation demand information. The network resource pool is configured to perform internetworking protocol (IP) address division on multiple processing servers in the calculation resource pool according to different application service categories, determine a required number of processing servers according to the resource consumption information, allocate the required number of processing servers from processing servers corresponding to the target application service category, and send the calculation demand information in the calculation request to one processing server of the allocated processing servers.

In an embodiment, the calculation demand information includes information for determining a required calculation.

In an embodiment, the multiple processing servers are ordered according to IP addresses to form a processing server queue; and the network resource pool is configured to send the calculation demand information in the calculation request to the one processing server of the allocated processing servers in a following manner: sending the calculation demand information in the calculation request to a processing server with an IP address ranked first among the allocated processing servers.

In an embodiment, the network resource pool is configured to allocate the required number of processing servers from the processing servers corresponding to the target application service category in a following manner: allocating, according to the IP addresses, the required number of processing servers sequentially from the processing servers corresponding to the target application service category in the processing server queue.

In an embodiment, the calculation resource pool includes multiple cabinets, multiple groups of processing servers are provided in each of the multiple cabinets, each processing server in the multiple groups of processing servers is a processing node, one processing node of multiple processing nodes is configured to receive the calculation demand information in the calculation request, call a file from the storage resource pool according to the calculation demand information, and in a case where the calculation demand information is received, send the calculation demand information to an adjacent next processing node, such that multiple processing nodes perform a calculation processing simultaneously, wherein the calculation demand information is received by each of the multiple processing nodes.

In an embodiment, the network resource pool is further configured to send target indication information to a processing server with an IP address ranked last among the allocated processing servers, where the target indication information is used for indicating that the processing server has no need to send the calculation demand information to an adjacent next processing node in a case where the calculation demand information is received by the processing server.

In an embodiment, the storage resource pool is provided with one file server, and the one file server is configured to be in a distributed connection with multiple storage devices, establish a storage path according to codes of the multiple storage devices, and receive a call request from the calculation resource pool.

In an embodiment, the one processing node is further configured to send a screening request to the shared database, acquire a corresponding calculation resource, and send the corresponding calculation resource to an adjacent next processing node.

BRIEF DESCRIPTION OF DRAWINGS

In order to illustrate technical schemes of embodiments of the present application, drawings, which need to be used in the description of the embodiments, will be briefly described below.

FIG. 1 is a schematic view of an overall structure of a data center management system of the present application.

DETAILED DESCRIPTION

Technical schemes in embodiments of the present application will be described below in conjunction with the drawings in the embodiments of the present application, and apparently, the described embodiments are merely part of the embodiments of the present application, rather than all of the embodiments of the present application.

Since traditional data centers do not have cloud platform functions, they are far inferior to the large-scale effective integration of across entity servers and even across data centers as cloud calculation, which limits the capability of providing value-added services.

Therefore, how to provide a cloud platform-based data center management system with an automatic calculation resource function is an urgent technical issue to be solved by those skilled in the art.

Referring to FIG. 1, FIG. 1 is a schematic view of a structure of a data center management system. The data center management system provided by this embodiment includes a data center, a cloud platform and an application platform. The application platform is configured to perform external network access through an application interface layer and send a calculation request to the data center. The data center includes a storage resource pool and a network resource pool. The storage resource pool is configured to perform distributed storage of files, and the network resource pool is configured to schedule the cloud platform according to the calculation request. The cloud platform includes a calculation resource pool and a shared database. The calculation resource pool includes multiple cabinets, multiple groups of processing servers are provided in each of the multiple cabinets. The calculation resource pool is configured to allocate the processing servers according to the received scheduling request, perform a distributed calculation between adjacent processing nodes, and call a file in the storage resource pool; and the shared database is configured to collect and store the calculation resource and the external shared data.

The application interface layer is configured to receive an application service message and parse out resource consumption information according to an application service category. The application interface layer performs user authentication and management authority authentication when performing network access. The resource consumption information includes a size of file content needing to be calculated and the complexity of calling a calculation method which are stored as log files to be sent to the data center.

The calculation requests are divided according to the application service categories and assigned with different identifiers. The network resource pool performs IP addresses division on multiple processing servers in the calculation resource pool according to different application service categories, and orders the multiple processing servers according to the IP addresses of the processing servers after the division to form a processing server queue. The network resource pool determines a required number of processing servers for a current application service category according to the resource consumption information, allocates the multiple processing servers sequentially according to the IP addresses, and sends the calculation request to a processing server with an IP address ranked first.

Each processing server is a processing node. One processing node of multiple processing nodes receives the calculation request, calls a file from the storage resource pool, and sends the calculation request to an adjacent next processing node. The multiple processing nodes perform a calculation processing simultaneously.

As one of the embodiments, a first processing server sends, after receiving the calculation request, this request to a second processing server, the second processing server sends this request to a third processing server, and so on. After the calculation is completed, a number N of processing servers uniformly send processing results to the network resource pool and feed the processing results back to the application platform.

The storage resource pool is provided with one file server, and the file server is in a distributed connection with multiple storage devices, establishes a storage path according to codes of the multiple storage devices, and receives call requests from the calculation resource pool and the network resource pool.

As one of the embodiments, if the application platform sends a storage/call file request, then the network resource pool sends the storage/call request to only the file server of the storage resource pool, and completes the storage and calling of files in the storage devices. The storage devices in the distributed connection are more beneficial to the quick search and storage of files.

As another embodiment, if the application platform needs to call the files for calculation upon sending the calculation request, then the calculation resource pool sends a call request to the file server.

The shared database is configured to collect and store operation and maintenance knowledge base data and external shared data to establish a huge knowledge base, so as to provide richer value-added services. The processing node sends a screening request to the shared database, acquires a corresponding calculation resource, and sends the corresponding calculation resource to an adjacent processing node.

In an embodiment, the value-added services refer to a provision of a data service that has been processed in advance, such as, a provision of data that has been classified according to preset classification information.

In this application, the cloud platform is built in the data center, the calculation resource pool and the shared database are allocated, so that the calculation capability of the data center is comprehensively improved, the network resource pool is utilized to achieve a reasonable allocation of the calculation resource pool. Moreover, a novel calculation server framework is provided. Calculation tasks of adjacent processing nodes in the calculation resource pool are shared, so that a master control server of a traditional cloud calculation is canceled, and the calculation capability sharing of multiple processing nodes can be achieved without the master control server sending tasks to the multiple processing nodes. Therefore, the automatic calculation resource function is achieved, the calculation resource is saved, and the calculation efficiency is improved.

Herein, relational terms such as first and second are used merely for distinguishing an entity or operation from another entity or operation, and do not necessarily require or imply that any such actual relationship or order exists between these entities or operations. Moreover, terms "includes" "including" or any other variants thereof are intended to cover a non-exclusive inclusion, such that a process, method, article, or device including a series of elements not only includes those elements, but also includes other elements not expressly listed or includes elements inherent to such process, method, article, or device. If there are no more restrictions, an element defined by the statement "including a . . . " does not exclude the existence of additional identical elements in a process, method, article, or device including the element.

What is claimed is:

1. A data center management system, comprising: a data center, a cloud platform and an application platform, wherein, the application platform is configured to perform external network access through an application interface layer and send a calculation request to the data center;

the data center comprises: a storage resource pool, which is configured to perform distributed storage of files; and a network resource pool, which is configured to send a scheduling request to the cloud platform according to the calculation request, to schedule the cloud platform; and the cloud platform comprises: a calculation resource pool, which is configured to perform a distributed calculation between adjacent processing nodes according to a received scheduling request, and call a file in the storage resource pool, or a calculation resource in a shared database and external shared data in the shared database; and the shared database, which is configured to collect and store the calculation resource and the external shared data.

2. The data center management system of claim 1, wherein the application interface layer is configured to receive an application service message, determine a target application service category according to the application service message, and parse out resource consumption information according to the target application service category; and the calculation request comprises the target application service category and the resource consumption information.

3. The data center management system of claim 2, wherein the calculation request further comprises calculation demand information, and the scheduling request comprises the calculation demand information; and the network resource pool is configured to perform internetworking protocol (IP) address division on a plurality of processing servers in the calculation resource pool according to different application service categories, determine a required number of processing servers according to the resource consumption information, allocate the required number of processing servers from processing servers corresponding to the target application service category, and send the calculation demand information in the calculation request to one processing server of the allocated processing servers.

4. The data center management system of claim 3, wherein the plurality of processing servers are ordered according to IP addresses to form a processing server queue; and the network resource pool is configured to send the calculation demand information in the calculation request to the one processing server of the allocated processing servers in a following manner: sending the calculation demand information in the calculation request to a processing server with an IP address ranked first among the allocated processing servers.

5. The data center management system of claim 4, wherein the network resource pool is configured to allocate the required number of processing servers from the processing servers corresponding to the target application service category in a following manner:

allocating, according to the IP addresses, the required number of processing servers sequentially from the processing servers corresponding to the target application service category in the processing server queue.

6. The data center management system of claim 5, wherein the calculation resource pool comprises a plurality of cabinets, a plurality of groups of processing servers are provided in each of the plurality of cabinets, each processing server in the plurality of groups of processing servers is a processing node, one processing node of a plurality of processing nodes is configured to receive the calculation demand information in the calculation request, call a file from the storage resource pool according to the calculation demand information, and in a case where the calculation demand information is received, send the calculation demand information to an adjacent next processing node, such that a plurality of processing nodes perform a calculation processing simultaneously, wherein the calculation demand information is received by each of the plurality of processing nodes.

7. The data center management system of claim 6, wherein the network resource pool is further configured to send target indication information to a processing server with an IP address ranked last among the allocated processing servers, wherein the target indication information is used for indicating that the processing server has no need to send the calculation demand information to an adjacent next processing node in a case where the calculation demand information is received by the processing server.

8. The data center management system of claim 7, wherein the one processing node is further configured to send a screening request to the shared database, acquire a corresponding calculation resource, and send the corresponding calculation resource to an adjacent next processing node.

9. The data center management system of claim 6, wherein the one processing node is further configured to send a screening request to the shared database, acquire a corresponding calculation resource, and send the corresponding calculation resource to an adjacent next processing node.

10. The data center management system of claim 1, wherein the storage resource pool is provided with one file server, and the one file server is configured to be in a distributed connection with a plurality of storage devices, establish a storage path according to codes of the plurality of storage devices, and receive a call request from the calculation resource pool.

* * * * *